Figure 1:
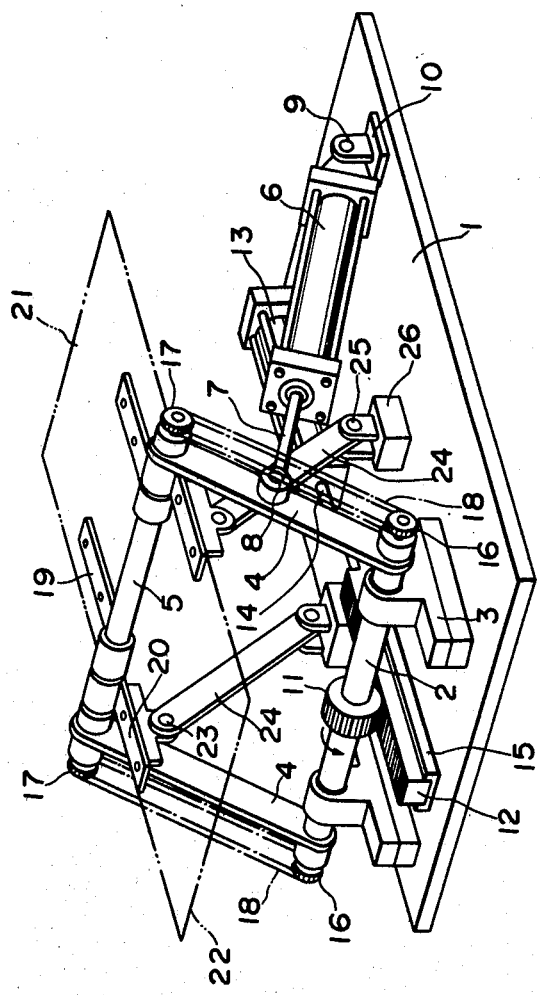
Figure 2A:
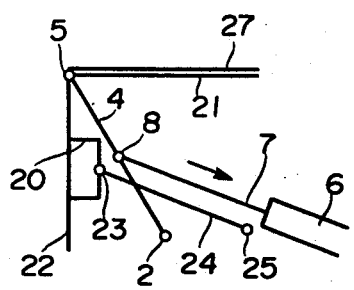
Figure 2B:
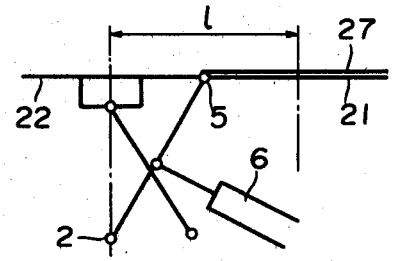
Figure 2C:
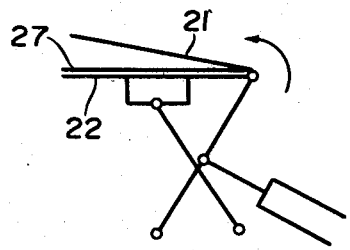
Figure 2D:
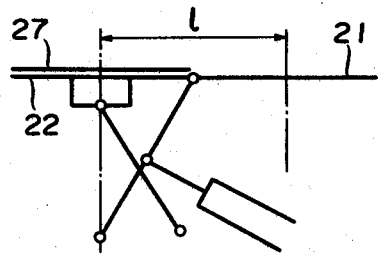

United States Patent [19]
Orii

[11] 4,454,781
[45] Jun. 19, 1984

[54] TURNOVER APPARATUS
[75] Inventor: Masaru Orii, Machida, Japan
[73] Assignee: Kabushiki Kaisha Orii Jidoki Seisakusho, Japan
[21] Appl. No.: 395,300
[22] Filed: Jul. 6, 1982
[51] Int. Cl.³ ............................................. F16H 21/44
[52] U.S. Cl. ..................................................... 74/99 R
[58] Field of Search ............... 74/469, 99 R; 414/759, 414/761, 774, 779

[56] References Cited
U.S. PATENT DOCUMENTS 3,487,953  1/1970  Wolf ................................. 414/759
3,954,170  5/1976  Schlough .......................... 414/760
4,095,700  6/1978  Chiuaru et al. .................. 414/759

FOREIGN PATENT DOCUMENTS 130402  10/1980  Japan .................................. 414/759
1294155  10/1972  United Kingdom .............. 74/25

Primary Examiner—Lawrence J. Staab
Assistant Examiner—Michael J. Gonet
Attorney, Agent, or Firm—Jordan B. Bierman; Linda Bierman; C. Cornell Remsen, Jr.

[57] ABSTRACT

A turnover apparatus for use in the secondary working stage of a press line is disclosed. The apparatus includes a bed that rotatably supports a main shaft, a pair of links the base of each of which is rotatably connected to each end of the main shaft, an inverting shaft parallel to the main shaft which is rotatably connected to the top end of each link, a piston rod in a driving cylinder connected to one of the two links, said piston rod causing the link to rotate about the main shaft, a pinion fixed to the main shaft, a piston in an inverting cylinder connected to a rack that engages the pinion, two sprockets of the same diameter fixed to both the main shaft and inverting shaft, a chain extending between the sprockets, an inverting plate fixed to the inverting shaft horizontally and a receiving plate rotatably connected to the inverting shaft. The receiving plate is fitted with a guide mechanism that causes it to rotate around the inverting shaft from the horizontal to a vertical downwardly bent position as a result of rotation of the link in such a direction that the inverting plate is retracted.

1 Claim, 6 Drawing Figures

TURNOVER APPARATUS

FIELD OF THE INVENTION

The present invention relates to an apparatus for turning over a workpiece for the subsequent step of pressing.

BACKGROUND OF THE INVENTION

A turnover apparatus is positioned between each press in the secondary working line of pressing. A workpiece that has been operated upon by a press is picked up by suction cups in a feeder and transferred to the turnover apparatus. The inverted workpiece is then picked up by the suction cups and transferred to the subsequent press. In the conventional turnover apparatus, the workpiece is turned over by a rotation about either one end of the work in the direction of the work feed, so the position of the workpiece that has been turned over differs from the initial position. It is therefore necessary to correct the position of the workpiece after it has been turned over. This requires that the space in which the turnover apparatus is installed be at least three times as large as the length of the inverting plate. In consequence, the pitch between presses and the feed stroke of the feeder are increased making it difficult to achieve a higher press line speed. As a further defect, the drive unit in the conventional turnover apparatus for rotating the inverting plate is moved horizontally, so the apparatus involves a complicated mechanism, is heavy and expensive.

SUMMARY OF THE INVENTION

Therefore, the primary object of the present invention is to provide a turnover apparatus that does not require a large space for installation and which is lightweight and inexpensive.

PREFERRED EMBODIMENT OF THE INVENTION

Figure 3:
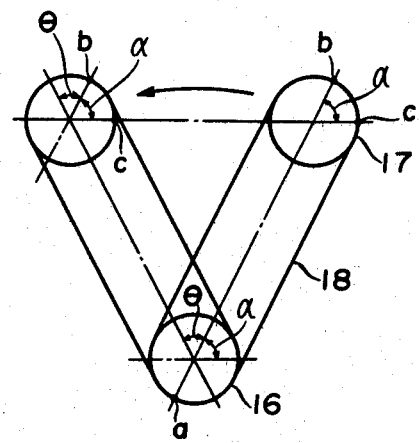

An embodiment of the present invention is described by way of example with reference to the drawings, wherein;

FIG. 1 is a perspective view showing one embodiment of the turnover apparatus of the invention;

FIGS. 2 (a) and (d) show schematically an operational sequence of the apparatus of FIG. 1; and FIG. 3 is a front view showing how sprockets and a chain connected across them are operated.

A frame or bed generally indicated at (1) has a main shaft (2) that is journaled on a plummer block (3). Each end of the shaft (2) is attached to the base of a pair of links (4). The top end of each link (4) is attached to an inverting shaft (5) that is paralled to the shaft (2). The center of one link (4) is connected to a piston rod (7) in a driving cylinder (6) by a pin (8). The cylinder (6) is fixed to the frame (1) by a pin (9) and a bracket (10).

A pinion (11) is fastened to the shaft (2) and a rack (12) engaging the pinion (11) is connected to a piston rod (14) in an inverting cylinder (13). The rack (12) has its direction of movement guided by a rack guide (15). The inverting cylinder (13) and rack guide (15) are fixed to the frame (1). Sprockets (16) and (17) of the same diameter are fixed to the main shaft (2) and inverting shaft (5), respectively. A chain (18) extends between the sprockets (16) and (17). Plate brackets (19) are fixed horizontally to the inverting shaft (5), but a plate brackets (20) are connected rotatably to the same shaft (5).

An inverting plate (21) is fixed to the plate brackets (19) and a receiving plate (22) is fixed to the plate bracket (20). The top end of each link (24) is connected to the plate bracket (20) by a pin, and the base of the link (24) is connected to a link bracket (26) by a pin (25). The pin (23), link (24), pin (25) and link bracket (26) make up a guided mechanism as defined in the present invention.

FIG. 1 shows the inverting plate (21) in the advanced position that is indicated by FIG. 2 (b). A workpiece (27) is fed to the inverting plate (21) when it is in the retracted position indicated by FIG. 2 (a). When the inverting plate is to be moved from the advanced position to the retracted position, the driving cylinder (6) is actuated to extend the piston rod (7) and to rotate the link (4) around the shaft (2) counterclockwise. This causes the inverting shaft (5) to rotate counterclockwise as it remains parallel to the main shaft (2). The rotation of the inverting shaft (5) causes the plate bracket (20) and receiving plate (22) to rotate around the inverting shaft (5) from its horizontal position to a vertical downwardly bent position as they are guided by the link (24). During the rotation of the plate bracket (20) and receiving plate (22), the sprocket (16) remains stationary, so if the link (4) that is inclined from the horizontal at an angle rotates by an angle, points b and c on the sprocket (17) move on the periphery of the sprocket (17) by the same angle. This means the sprocket (17) turns around its axis by an angle. But this angle is offset by the angle by which the sprocket (17) rotates about the main shaft (2) due to the rotation of the link (4). As a result, the sprocket (17) has moved without rotation, and the inverting plate (21) moves as it remains horizontal.

When the workpiece (27) is fed to the inverting plate (21) in the position indicated by FIG. 2 (a), the piston rod (7) is retracted into the drive cylinder (6) and the inverting plate (21) advances horizontally whereas the receiving plate (22) in the vertical downwardly bent position returns to a horizontal position as indicated by FIG. 2 (b). The advancing stroke of the plate (22) is indicated by 1 in FIG. 2 (b). Then, the inverting cylinder (13) is actuated to pull the rack (12) toward the cylinder (13) so as to rotate the pinion (11) counterclockwise. This causes the inverting shaft (5), plate bracket (19) and inverting plate (21) to rotate counterclockwise as indicated in FIG. 2 (c) by means of the main shaft (2), sprocket (16), chain (18) and sprocket (17), and as a result, the work (27) on the inverting plate (21) is turned over on the receiving plate (22). Then, the inverting cylinder (13) immediately pushes the rack (12) away from it and the inverting plate (21) is returned to the initial position indicated in FIG. 2 (d). The inverted work (27) has retracted by a distance to the position in which it was initially fed. The work in the position shown in FIG. 2 (d) is picked up by the suction cups and transferred to the subsequent press.

When the inverting plate (21) retracts, the receiving plate (22) in a horizontal position rototates to a vertical downwardly bent position. Therefore, the space necessary to install the turnover apparatus of the present invention in the direction in which the inverting plate (21) moves is a little more than twice the length of that plate. If the receiving plate (22) were to remain horizontal while the inverting plate (21) is retracting, the necessary installation space is at least three times the length of the inverting plate (21).

In the illustrated embodiment, the workpiece (27) would be turned over in the direction parallel to the feed direction. But by positioning the inverting shaft (5) parallel to the feed direction, the work (27) can be turned over in a direction normal to the feed direction. The guide mechanism including the link (24) may be replaced by a roller attached to the side edge of the receiving plate (22) which engages an elongated groove in arc form. The inverting plate (21) and receiving plate (22) shown in the embodiment are in the form of a flat sheet, but they may have various forms depending upon the shape of the workpiece (27). These plates may also be equipped with vacuum or electromagnetic suction cups for holding the workpiece (27).

According to the present invention, the plate that receives the workpiece to be turned over by the inverting plate is fitted with a guide mechanism that causes the receiving plate to rotate around the inverting shaft from the horizontal to a vertical downwardly bent position as a result of rotation of the link (4) in such a direction that the inverting plate is retracted, and in consequence, the receiving plate bends downwardly in a vertical direction when the inverting plate retracts. This reduces the space necessary for installing the turnover apparatus in the direction of the movement of the inverting plate, decreases the pitch between presses and the feed stroke of the feeder and increases the press line speed. As a further advantage, the inverting plate is moved by the rotation of the link (4), so a simple and lightweight driving mechanism can be used. This, coupled with the use of a cylinder as driving means to move and turn over the inverting plate, contributes to reducing the production cost of the turnover apparatus.

What is claimed is:

1. A turnover apparatus including a bed that rotatably supports a main shaft, a pair of links the base of each of which is rotatably connected to each end of the main shaft, an inverting shaft parallel to the main shaft, which is rotatably connected to the top end of each link, a piston rod in a driving cylinder connected to one of the two links, said piston rod causing the link to rotate about the main shaft, a pinion fixed to the main shaft, a piston rod in an inverting cylinder connected to a rack that engages the pinion, two sprockets of the same diameter, one fixed to the main shaft and the other fixed to the inverting shaft, a chain stretched across the sprockets, an inverting plate fixed to the inverting shaft horizontally, a receiving plate rotatably connected to the inverting shaft, the receiving plate being fitted with a guide mechanism that causes the receiving plate to rotate around the inverting shaft from the horizontal to a vertical downwardly bent position as a result of rotation of the links in such a direction that the inverting plate is retracted.

* * * * *